United States Patent [19]

Horton

[11] Patent Number: 4,841,273
[45] Date of Patent: Jun. 20, 1989

[54] HIGH TEMPERATURE SENSING APPARATUS

[75] Inventor: Paul J. Horton, Moorpark, Calif.

[73] Assignee: Therm-O-Disc, Incorporated, Mansfield, Ohio

[21] Appl. No.: 134,881

[22] Filed: Dec. 18, 1987

[51] Int. Cl.$^4$ .................... G01K 01/14; H01C 01/012
[52] U.S. Cl. .................................. 338/28; 338/309; 374/149; 374/183
[58] Field of Search .................. 374/185, 149; 338/25, 338/27 R, 28, 309

[56] References Cited

U.S. PATENT DOCUMENTS

| | | | |
|---|---|---|---|
| 3,537,053 | 10/1970 | Snoberger et al. | 338/25 |
| 3,720,900 | 3/1973 | Von Bruning | 338/25 |
| 3,936,790 | 2/1976 | Eastwood et al. | 338/25 |
| 4,007,435 | 2/1977 | Tien | 338/28 X |
| 4,139,833 | 2/1979 | Kirsch | 338/25 |

Primary Examiner—Daniel M. Yasich
Attorney, Agent, or Firm—Jones, Day, Reavis & Pogue

[57] ABSTRACT

A pair of spaced-apart electrically conductive strips are fused along their entire length to a ceramic substrate. The conductive strips are connected with a variable resistance device whose resistance varies with temperature. The ceramic substrate and components mounted thereon are inserted in a metal sheath to form a temperature sensing probe.

8 Claims, 2 Drawing Sheets

HIGH TEMPERATURE SENSING APPARATUS

BACKGROUND OF THE INVENTION

This application relates to the art of temperature sensing and, more particularly, to sensing of very high temperatures. The invention is particularly applicable to apparatus used for sensing temperatures in ovens or the like, and will be described with particular reference thereto. However, it will be appreciated that the invention has broader aspects, and can be used for sensing temperatures in other environments.

The temperature gradient between the opposite end portions of a temperature sensing probe is often very large. This large temperature gradient, and the extremely high temperatures at the sensing end of the probe, often cause failure of the probe or significantly reduce its life.

It would be desirable to have a temperature sensing probe assembled in such a way that the possibility of failure is minimized, and its useful life is extended.

SUMMARY OF THE INVENTION

A temperature sensing probe includes a pair of elongated spaced-apart electrically conductive strips fused along their entire length to a ceramic substrate. The conductive strips are connected at one end thereof to a platinum resistance thermometer element that is adhesively bonded to the ceramic substrate.

In a preferred arrangement, the electrically conductive strips comprise a conductive thick film ceramic material that is deposited on the ceramic substrate and then fired for fusing same to the substrate.

The conductive strips are connected with the platinum resistance thermometer by gold wires.

The opposite or cooler end portions of the conductive strips, opposite from the platinum resistance thermometer chip, are connected to an electrical terminal with a conductive adhesive, such as conductive epoxy.

The assembled ceramic substrate is inserted into a metal sheath to form a temperature probe.

It is a principal object of the present invention to provide a temperature sensing probe that is capable of withstanding high temperatures and high temperature gradients.

It is also an object of the invention to provide a temperature sensing device that is relatively economical to manufacture and assemble.

DESCRIPTION OF A PREFERRED EMBODIMENT

Figure 1:
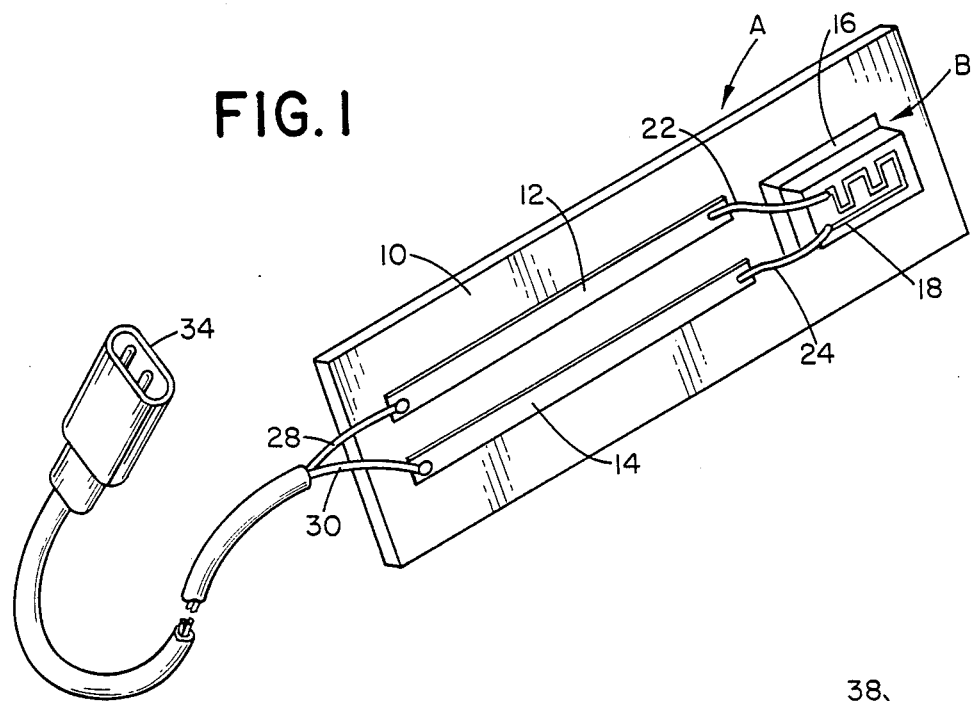
FIG. 1 is a perspective illustration of a temperature sensing apparatus constructed in accordance with the present application.
Figure 2:
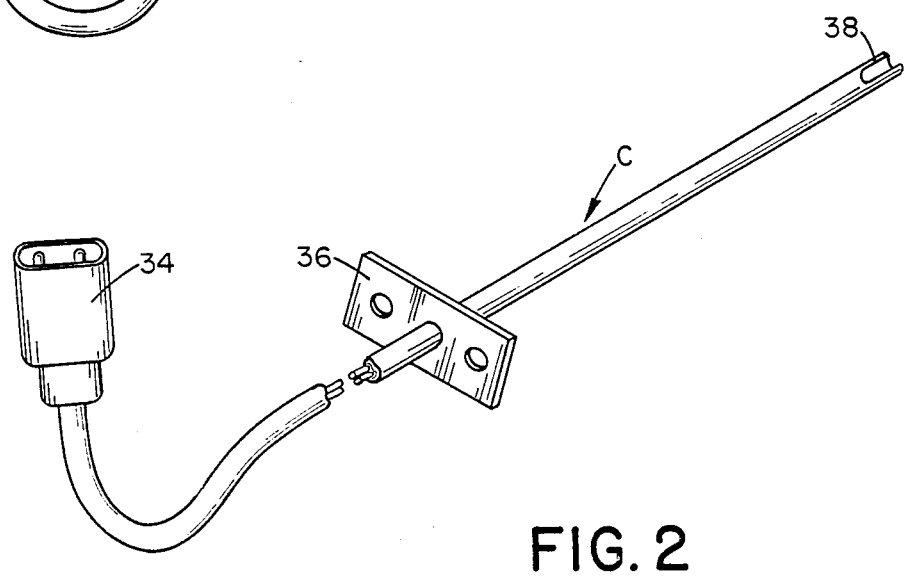
FIG. 2 is an illustration of a protective sheath having the assembly of FIG. 1 received therein.

Referring now to the drawing, wherein the showings are for purposes of illustrating a preferred embodiment of the invention only, and not for purposes of limiting same, FIG. 1 shows a substantially flat and rectangular ceramic substrate A of alumina or the like. Substrate A has a substantially flat surface 10 extending along the entire length thereof.

A pair of elongated spaced-apart conductive strips 12, 14 are provided on substrate surface 10. In a preferred arrangement, conductive strips 12, 14 are formed by laying down strips of a conductive ceramic glaze, and then firing same to fuse the glaze strips along their entire length to the substrate surface. Thus, conductive strips 12, 14 are conductive thick films. With both substrate A and conductive strips 12, 14 being of ceramic material and fused together, the coefficients of expansion of same are close enough that fractures in the conductive strips are unlikely.

A platinum resistance thermometer chip or die B is attached to substrate surface 10 as by the use of a ceramic adhesive 16. Chip B defines a variable resistance means whose resistance varies with temperature. A platinum resistance circuit 18 is deposited on chip B in the form of a thin film as by sputtering, and is photolithographically shaped. Obviously, other types of sensing devices could be used.

Gold wires 22, 24 are connected to conductive strips 12, 14, and to resistance circuit 18, by ultrasonic welding, by thermocompression welding (heat and pressure), of by thermosonic welding (heat and ultrasonic power). This makes the high temperature end portion of the apparatus very reliable. The gold wires and ultrasonic welds define connecting means for connecting strips 12, 14 in electrically conductive relationship with resistance circuit 18.

The opposite or cooler end portions of strips 12, 14 are connected with conventional wires 28, 30 by the use of a conductive adhesive, such as a conductive epoxy. Wires 28, 30 are attached to a suitable connector 34 for connecting the variable resistance means B to an electrical circuit.

Ceramic substrate A is receivable in a protective metal sheath C to form a temperature probe. The diameter of sheath C is slightly greater than the width of ceramic substrate A so that the entire length of substrate A is receivable in sheath C down the center thereof. A suitable mounting bracket 36 is provided on sheath C for mounting same in a desired location with end portion 38 thereof positioned in the desired location for sensing the temperature of an environment. Variable resistance means B is located within sheath C adjacent end portion 38 thereof.

Instead of ceramic substrate A being substantially flat and rectangular, it will be recognized that other shapes are also possible. For example, substrate A could have a generally triangular cross-sectional shape, with surface 10 being one of the flat surfaces of the triangle. Conductive strips 12, 14 extend over a major portion of the length of ceramic substrate A, and variable resistance means B is mounted adjacent one end portion of substrate A. Gold wires 22, 24 provide a highly reliable connecting means for connecting variable resistance means to the conductive strips. Resistance circuit 18 is mounted on a ceramic die which in turn is adhesively bonded to substrate A.

Simply by way of example, and not by way of limitation, conductive strips 12, 14 may be laid down on substrate A as a thick film by use of a ceramic glaze conductive ink. The substrate and thick film strips are fired to fuse same together. The firing temperature may vary and, by way of example only, can be around 850° C.

Resistance circuit 18 is provided on its ceramic die as by sputtering in a known manner to form a thin film. The die may be alumina or sapphire. Conductive ceramic glazes and adhesives are made by filling same with conductive metal particles.

The variable resistance means may be connected in one leg of a wheatstone bridge for measuring the excitation current flowing through the resistant circuit. The temperature probe of the present application may be used to signal a solenoid for locking a door shut in a self-cleaning oven. The probe could also be used for turning a heating element off or for modulating same to maintain a desired temperature. The resistance of the conductive strips 12, 14 is small compared to the resistance of thermometer die B, and has a negligible effect on the temperature performance of die B.

Figure 3:
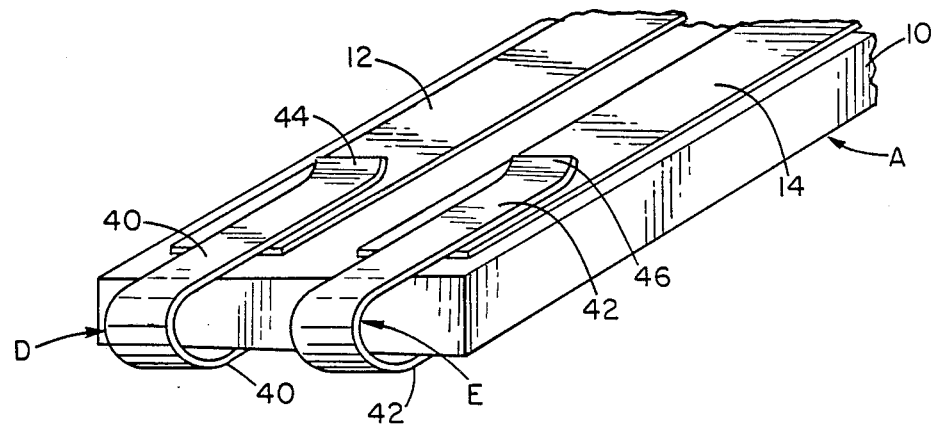
FIG. 3 is a partial perspective illustration showing terminals connected directly to the cool end of the ceramic substrate.

Instead of connecting wires 28 30 to conductive strips 12, 14 at the cool end of the device, it is possible to insert the cool end directly into a connector socket. FIG. 3 shows generally U-shaped connector terminals D, E having spaced-apart legs 40, 42 and outwardly curved ends 44, 46. Terminals D, E are mounted in a connector body, within which wires are suitably connected to terminals D, E. This allows the cool end of the device to be directly inserted into terminals D, E. Legs 40, 42 resiliently grip substrate A, and frictionally engage strips 12, 14 in conductive relationship.

Figure 4:
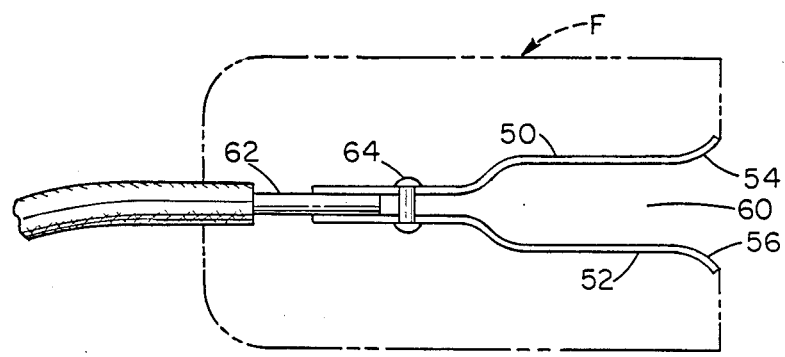
FIG. 4 is a side elevational view of a terminal that can be connected directly to the cool end of the ceramic substrate.

FIG. 4 shows a connector body F enclosing spaced-apart blades 50, 52 having outwardly curved outer end portions 54, 56 between which an entrance socket 60 is defined. The inner end portions of blades 50, 52 are turned inwardly and secured together in clamping relationship to wire 62 by fastener means 64. The spacing between blades 50, 52 is less than the thickness of substrate A and strips 12, 14 so that the substrate and strips are resiliently gripped between the blades.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the claims.

I claim:

1. A temperature sensing device for high temperatures comprising:

an elongated ceramic member having a substantially flat surface along the length thereof;

a pair of elongated spaced-apart electrically conductive strips extending along said substantially flat surface and being fused along the entire length thereof to said ceramic member;

variable resistance means having a resistance that varies with temperature and being mounted on said ceramic member;

said variable resistance means being in the form of a resistance thermometer-type of sensing device through which a variable excitation current flows that is proportional to the temperature thereof and which is heated by a heat source whose temperature is to be sensed and that is completely separate from said temperature sensing device; and connecting means for connecting said conductive strips in electrically conductive relationship with said resistance means, said connecting means comprising precious metal wires welded to said conductive strips and to said variable resistance means.

2. The temperature sensing device of claim 1 wherein said conductive strips comprise electrically conductive ceramic glaze, said ceramic member and said glaze having a substantially uniform coefficient of thermal expansion.

3. The temperature sensing device of claim 1 including an elongated metal tube in which said ceramic member is received.

4. A temperature sensing device for high temperatures comprising:

an elongated ceramic member having opposite ends;

variable resistance means having a resistance that varies with temperature and being mounted on said ceramic member adjacent one said end thereof;

a ceramic die having said variable resistance means mounted thereon, said die being bonded to said ceramic member;

elongated conductors mounted on said ceramic member and extending therealong between said ends thereof; and connecting one end of means for connecting said conductors with said variable resistance means and the other end to a connector means.

5. The temperature sensing device of claim 4 wherein said conductors comprise conductive ceramic strips fused along the entire length thereof to said ceramic member.

6. The temperature sensing device of claim 5, wherein said conductive ceramic strips comprise a gold filled ceramic glaze.

7. The temperature sensing device of claim 4, wherein said connecting means comprises gold wires welded to said conductors and to said resistance means.

8. The temperature sensing device of claim 4, wherein said ceramic member and said conductors have a substantially uniform coefficient of thermal expansion.

* * * * *